Dec. 25, 1951 W. J. STUBER ET AL 2,580,252
VENETIAN BLIND
Filed Oct. 19, 1949 2 SHEETS—SHEET 1
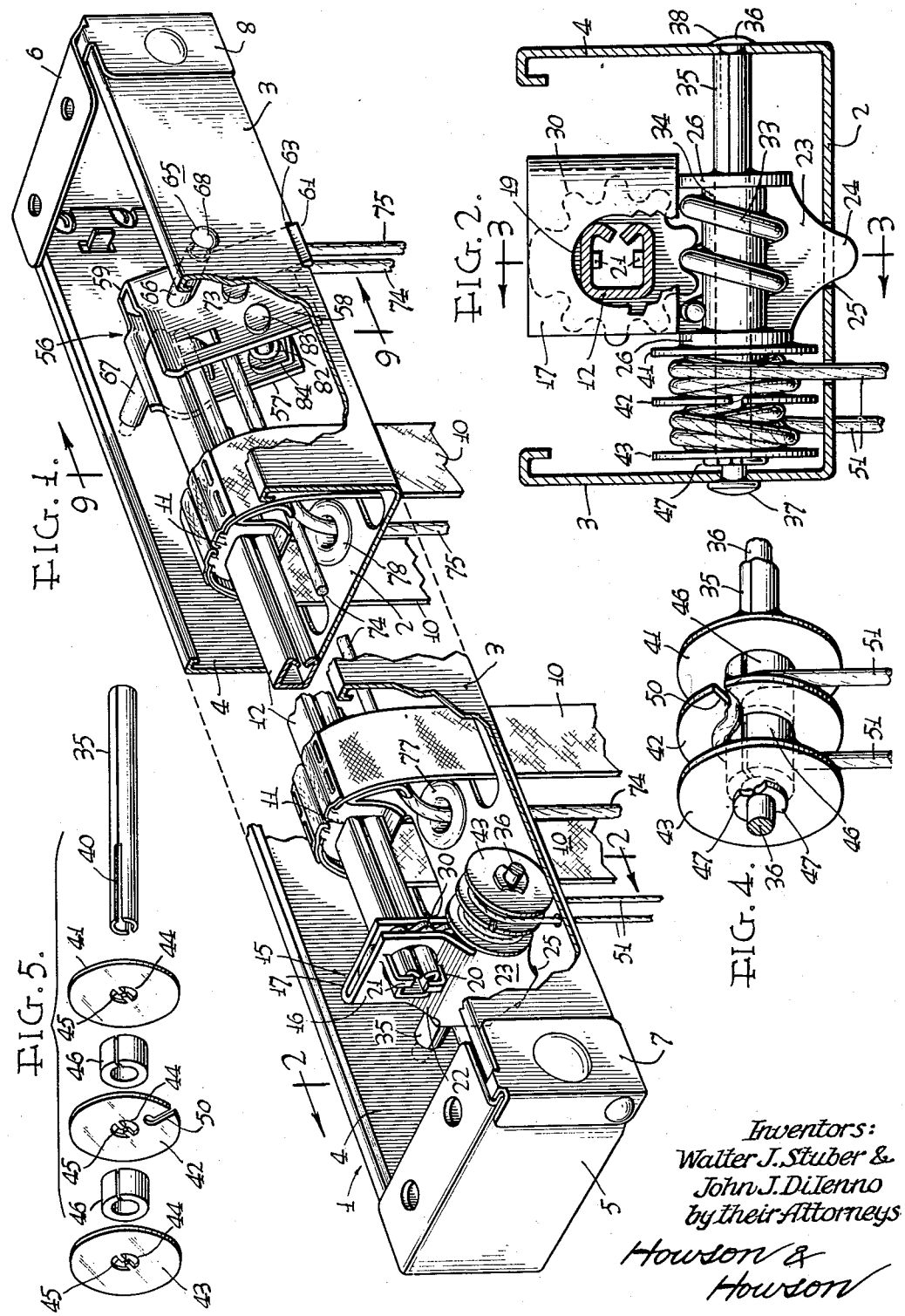
Inventors:
Walter J. Stuber &
John J. DiIenno
by their Attorneys
Howson & Howson Dec. 25, 1951   W. J. STUBER ET AL   2,580,252
VENETIAN BLIND
Filed Oct. 19, 1949   2 SHEETS—SHEET 2
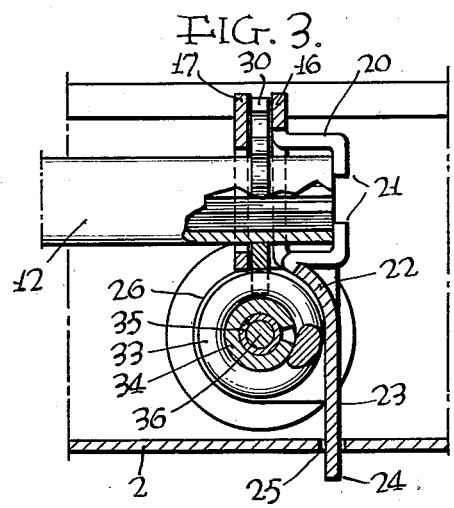
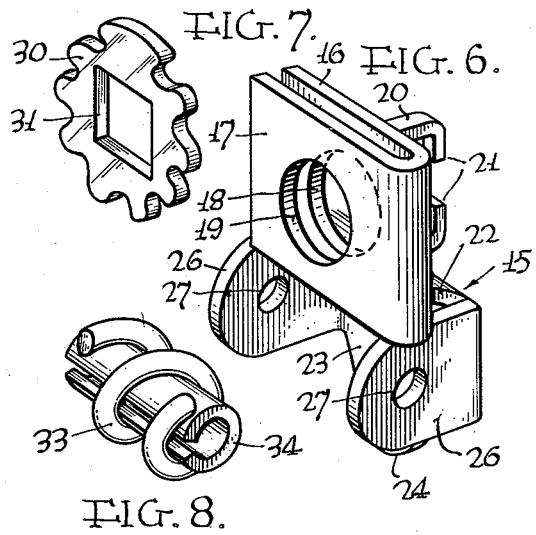
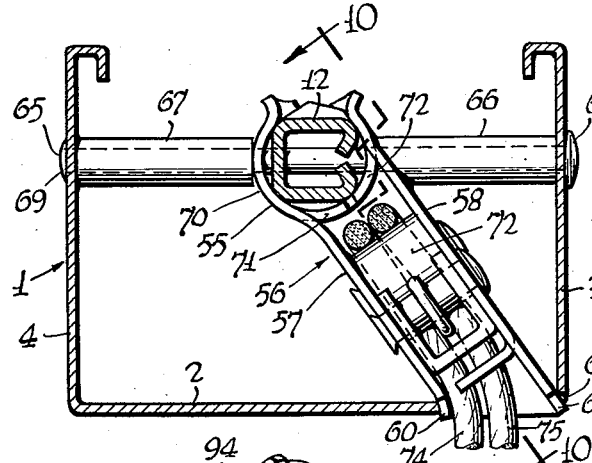
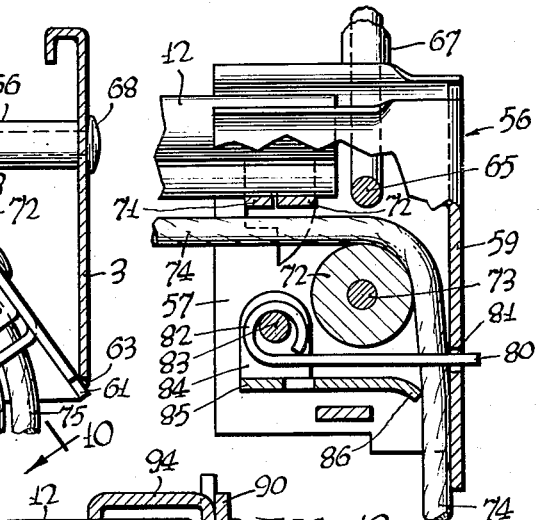
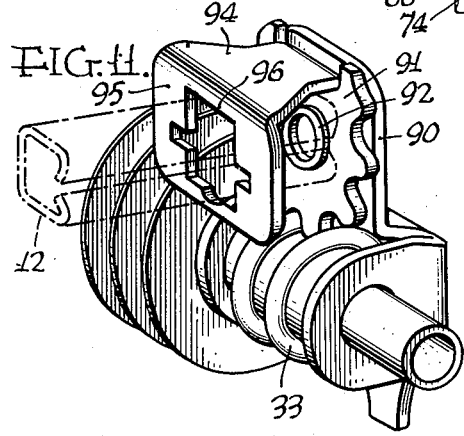
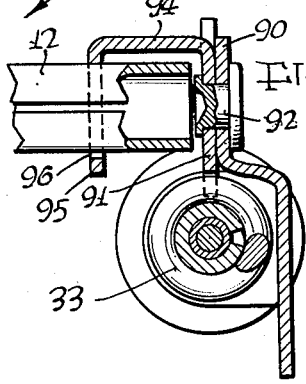
Inventors:
Walter J. Stuber &
John J. DiIenno
by their Attorneys
Howson &
Howson Patented Dec. 25, 1951

2,580,252

UNITED STATES PATENT OFFICE 2,580,252

VENETIAN BLIND

Walter J. Stuber and John J. Di Ienno, Philadelphia, Pa., assignors to Carey-McFall Company, Philadelphia, Pa., a corporation of Pennsylvania Application October 19, 1949, Serial No. 122,192

5 Claims. (Cl. 160—176)

1

This invention relates to new and useful improvements in Venetian blinds, and more particularly to such blinds, which are fabricated entirely of metal except for the usual fabric tapes and the tilt and elevating cords.

One object of the present invention is to provide a novel tilt shaft supporting bracket and actuating mechanism which is fabricated of highly simplified sheet metal stampings that may be produced by mass production methods at very low cost.

Another object of the invention is to provide a tilt shaft actuating mechanism as set forth which embodies novel features of construction and arrangement that eliminate entirely the prevalent and objectional slippage of the tilt cord relative to the tilting mechanism.

Another object of the invention is to provide a novel bracket for supporting the tilt shaft and elevating cord locking mechanism of a Venetian blind which also is of highly simplified sheet metal construction capable of being produced in mass production at very low cost.

A further object of the invention is to provide the foregoing objectives by constructions and arrangements of parts which are entirely foolproof and highly efficient in operation and use.

These and other objects of the invention and the various features and details of the construction and operation thereof are hereinafter fully set forth and described with reference to the accompanying drawings in which:

Fig. 1 is a view in perspective of a head casing structure embodying the present invention, with a portion of said casing broken away to better illustrate certain features of the invention;

Fig. 2 is an enlarged sectional view taken on line 2—2, Fig. 1;

Fig. 3 is a sectional view taken on line 3—3, Fig. 2;

Fig. 4 is a detached perspective view of the actuating means to which the tilt cord is operatively connected.

Fig. 5 is a perspective view showing in relatively separated relationship the several parts of the assembly shown in Fig. 4;

Figs. 6, 7 and 8, respectively, are detached perspective views of other parts of the tilt bar actuating mechanism.

Fig. 9 is an enlarged sectional view taken on line 9—9 of Fig. 1;

Fig. 10 is a sectional view taken on line 10—10, Fig. 9; and

Figs. 11 and 12 are perspective and sectional views, respectively, of a modified form of tilt bar actuating mechanism embodying the present invention.

Referring now more particularly to the drawings, the Venetian blind construction of the present invention comprises a head casing 1 adapted to be installed in a window frame in the customary position below the underside of the top rail thereof and between the left and right hand side rails.

As shown, for example in Fig. 2, the head casing 1 is of channel shape in cross-section and includes a bottom panel 2, front panel 3 and rear panel 4. The opposite ends of the head casing 1 are supported in hanger brackets 5 and 6 respectively, which are fixedly secured to the underside of the window frame top rail and provided with outwardly facing hinged portions 7 and 8 which may be opened and closed to permit insertion and withdrawal of the head casing 1 with respect to the said hanger brackets.

The usual spaced slats and bottom rail of the blind (not shown) are supported in the conventional manner by pairs of spaced ladder tapes 10, the upper ends of which are attached to drum segments 11 that in turn are mounted upon a tilt shaft 12 within the casing 1.

The tilt shaft 12 preferably is fabricated of sheet metal and is of tubular construction having a generally quadrilateral or square cross-sectional configuration. At its left-hand end the tilt bar 12 is rotationally supported in the head casing 1 by a tilt mechanism bracket generally designated 15 and separately shown in Fig. 6 of the drawings. The tilt mechanism bracket 15 preferably is of stamped sheet metal construction and includes upper relatively closely spaced vertically disposed parallel flange portions 16 and 17, respectively, adapted to extend crosswise of the head casing 1 and having aligned circular openings 18 and 19 therein of a diameter to rotationally receive and support the tilt shaft 12. The flange portion 16 of the bracket 15 is provided with a pair of pressed out lugs 20 having inturned portions 21 disposed endwise of the tilt shaft 12 and adapted to prevent longitudinal displacement thereof within the head casing 1.

The portion 16 of the tilt mechanism bracket 15 at its lower end declines outwardly as indicated at 22 and then extends substantially vertically downward as indicated at 23, terminating in a projecting tongue portion 24 that is adapted to engage within a slot or like opening 25 in the bottom panel 2 of the head casing 1 to thereby fixedly position the bracket 15 longitudinally of the head casing 1. Projecting inwardly from opposite sides of the bracket portion 23 are parallel ears 26 which are disposed at right angles to the upper flanges 16 and 17 and extend longitudinally of the head casing 1. These ears 26 are provided with aligned openings 27 and it is to be noted that the construction and arrangement of the several parts of the tilt bracket 15 and the position of the openings 27 in the flanges 26 thereof are such that the common axis of said openings 27 is disposed directly beneath and in centered relation in respect to upper flange portions 16 and 17 of said bracket, for example, in the relation shown in Fig. 3 of the drawings.

Disposed intermediate the tilt bracket flanges 16 and 17 and mounted upon the inserted end portion of the tilt shaft 12 is a worm wheel 30 having an opening 31 therein to receive the tilt shaft 12. As shown in Fig. 7, the opening 31 conforms to the polygonal configuration of the shaft 12 for the purpose of preventing relative rotation of the wheel 30 with respect to the said tilt shaft.

The worm wheel 30 meshes with a worm 33 which is fixed to a sleeve 34 that is rotatably supported intermediate the ears 26 of the tilt bracket 15 in the relation shown, for example, in Fig. 2. In the present instance, the sleeve 34 is rotationally supported between the bracket ears 26 by means of a sleeve 35 to which latter the worm sleeve 34 is fixedly secured so as to rotate therewith. The sleeve 35 is of greater length than the sleeve 34 and is rotatably supported in the aligned openings 27 in the bracket ears 26.

The sleeve 35 in turn is rotatably supported upon a pin or rivet 36 which extends entirely through the sleeve 35 and the front and rear panels 3 and 4 of the head casing 1. The pin 36 is secured in place by a head portion 37 at one end which outwardly overlies the head casing front panel 3 and by upsetting the other end thereof so that it engages outwardly over the rear casing panel 4, for example, as indicated at 38 in Fig. 2. This construction, together with the engagement of the tilt bracket tongue 24 in the slot 25 in the casing bottom panel 2 effectively secures the tilt bracket 15 in proper position within and relative to the head casing 1.

Referring now more particularly to Figs. 4 and 5 of the drawing, it is to be noted that the outer end of the sleeve 35 is diametrically slotted over a portion of its length, as indicated at 40, to slidably receive thereon an inner disc 41, an intermediate disc 42 and an outer disc 43. Each of the discs 41, 42 and 43 is provided with a central opening 44 to receive the sleeve 35 and the openings 44 each have diametrically disposed inwardly extending projections 45 adapted to slidably engage within the diametrical slots 40 in said sleeve 35 and thereby prevent relative rotation of said discs 41, 42 and 43 with respect to said sleeve. The discs 41, 42 and 43 are maintained in relatively spaced relation upon the sleeve 35 by means of suitable collars 46 which are secured on the sleeve 35 between the adjacent discs, and the entire assembly of discs and spacer collars is retained on the sleeve 35 by bending outwardly and over the outer face of the disc 43 the projecting bifurcated end portions of said sleeve, as indicated at 47.

The intermediate disc 42 is radially slotted as indicated at 50 and this slot is of a size to receive and firmly engage approximately the mid point of a customary tilt cord 51. Preferably several turns of the tilt cord 51 adjacent the mid point engaged in the slot 50 are wrapped in opposite directions about the spacer collars 46 at opposite sides of the intermediate disc 42, for example, in the manner shown more clearly in Fig. 2 of the drawings.

The operation of the tilt mechanism is conventional in that all that is necessary to do is to exert a downward pull on one end portion or other of the tilt cord 51. A pull on one end of the tilt cord 51 will operate through its connection with the disc 42 to rotate the sleeve 35 in the corresponding direction and thereby rotationally drive the worm 33 and wheel 30 to cause the tilt shaft 12 to be rotated in one direction, it being obvious that a pull on the other portion of the tilt cord 51 would operate in just the reverse manner to effect rotation of the shaft 12 in the opposite direction. The described arrangement of the tilt cord 51, including the engagement thereof in the slot 50 of the disc 42, precludes any slippage of the cord 51 with respect to the tilt mechanism so that one of the most common undesirable features present in many Venetian blind constructions is entirely eliminated.

The other, or right-hand, end of the tilt shaft 12 is rotationally supported in an upper rounded socket portion 55 of a bracket which is generally designated by the reference numeral 56. As shown in Figs. 1, 9 and 10 of the drawings, the bracket 56 comprises parallel side wall portions 57 and 58 joined together at their outer edges by an end wall portion 59. The bracket 56 is mounted in the head casing 1 with its side walls 57 and 58 obliquely disposed, for example, as shown in Fig. 9.

The lower end of the bracket 56 is anchored with respect to the bottom panel 2 of the head casing 1 by means of lugs 60 and 61 on the side walls 57 and 58, which lugs 60 and 61 project downwardly through a suitable opening 63 formed in the head casing bottom panel 2, and the upper end of the bracket 56 is supported by means of a pin 65 which passes entirely through the shaft supporting socket portion 55 thereof and through the front and rear panels 3 and 4 of the head casing, suitable spacer sleeves 66 and 67 being provided on the pin 65 for the purpose of appropriately supporting the upper end of the bracket 56 with respect to the head casing side panels. The pin 65 is fixedly secured in the described relation and against displacement from the head casing by a head portion 68 at one end thereof which is adapted to outwardly overlie the casing front panel 3 and the other end of the pin 65 is upset so as to overlie the casing rear panel 4, as indicated at 69.

The socket portion 55 of the bracket 56 which supports the tilt shaft 12 is formed by an offset rounded portion 70 in the bracket side wall 57 and by pressed out arcuate fingers 71 and 72, respectively, pressed out from the said wall 57 and the other wall 58 of the bracket. As shown in Figs. 9 and 10, the pin 65 passes through the socket portion 55 of bracket 56 in an endwise relation with respect to the tilt shaft 12 so that, in addition to its previously described function, the said pin 65 serves also as a stop to prevent longitudinal displacement of the tilt shaft 12 in the right-hand direction with respect to the Figs. 1 and 10.

Rotationally mounted intermediate the bracket walls 57 and 58 is a roller or wheel 72. The wheel 72 is mounted upon a fixed shaft 73 that is secured in and spans the space between the side walls 57 and 58. The usual pair of parallel elevating cords 74 and 75 are trained around the wheel or roller 72 and passed downwardly between the bracket side walls 57 and 58 adjacent the end wall 59 and then outwardly through the opening 63 in the bottom panel 2 of the head casing 1. In the other direction the cords 74 and 75 extend from the wheel or roller 72 longitudinally through the head casing 1 and then downwardly through suitable grommetted openings 77 and 78 provided in the head casing bottom panel 2 between the respective pairs of ladder tapes 19 and through which the pull cords 74 extend downwardly through the usual slats with their lower ends attached to the bottom rail of the blind in the usual manner.

Within the bracket 56 and below the wheel or roller 72 the cords 74 and 75 are maintained in relatively separated side by side relation to each other by means of a finger 80 the outer end of which extends between said pull cords and outwardly through an opening 81 provided in the end wall 59 of the said bracket 56. At its other or inner end the finger 80 is bent to form an eyelet 82 which is loosely mounted upon a cross-pin or shaft 83 that has its opposite ends secured in the bracket side walls 57 and 58.

Also pivotally mounted on the cross-pin or shaft 83 are the upstanding ear portions 84 of a locking latch 85 having a projecting portion provided with a downwardly curved end 86 which is adapted to engage the elevating cords 74 and 75 and clamp the same between said edge 86 and the bracket end wall 59 when pull on the elevating cords is released. In order to elevate the slats the freely hanging portions of the elevating cords 74 and 75 are pulled downwardly in the usual manner and when the desired elevation of the blind has been attained the cords 74 and 75 are simply released so that the drag exerted by the cords on the locking latch 85 causes the latter to be pivoted slightly in the counter-clockwise direction and thereby clamp the cords between its edge 86 and the end wall 59 of the bracket 56.

A modified form of tilt bracket is disclosed in Figs. 11 and 12 of the drawings. The construction of this embodiment of tilt bracket is identical to that previously described except that, in the modification illustrated, the bracket comprises a single upper flange 90 to which a worm wheel segment 91 is rotatably mounted by means of a member 92. The worm wheel segment 91 is meshed with the worm 33 in the manner and relationship previously described, and said worm segment 91 is provided with a longitudinal extension 94 which terminates in a depending arm 95 disposed in a plane parallel to the plane of the worm segment and spaced axially therefrom. The arm 95 is provided with a quadrilateral opening 96 through which the end of the tilt shaft 12 extends so that the said shaft 12 is in effect keyed to the worm segment 91 for concurrent rocking motion therewith when acuated by the worm 33.

From the foregoing description it will be observed that the present invention provides a novel tilt shaft supporting bracket and actuating mechanism for Venetian blinds which is fabricated of highly simplified sheet metal stampings which may be produced by mass production methods at very low cost.

The invention also provides a tilt shaft mechanism as set forth which eliminates entirely the prevalent and objectionable slippage of the tilt cord relative to the tilt mechanism.

The invention further provides a novel bracket for supporting the tilt shaft and elevating cord locking mechanism which likewise is of highly simplified sheet metal construction adaptable to low cost mass production.

While certain embodiments of the present invention have been illustrated and described herein, it is not intended to restrict the invention to such disclosures, and changes and modifications may be made therein and thereto within the scope of the following claims.

We claim:

1. Tilt mechanism for a Venetian blind comprising a bracket including upper closely spaced parallel flanges and lower relatively widely spaced parallel ears extending at right angles to said flanges, a tilt shaft having an end thereof rotatably supported in openings in said bracket flanges, a worm wheel intermediate said bracket flanges and mounted on said tilt shaft for rotation therewith, a member rotatably mounted in aligned openings in the bracket ears, a worm fixed on said member and meshed with said worm wheel, at least one disc secured on said member for rotation therewith, and having a slot therein, and a tilt cord having an intermediate portion securely engaged in said radial slot with adjacent cord portions coiled about said member in opposite directions at respectively opposite sides of said disc.

2. Tilt mechanism for a Venetian blind comprising a bracket including upper closely spaced parallel flanges and lower relatively widely spaced parallel ears extending at right angles to said flanges, a tilt shaft of polygonal cross-sectional shape having an end thereof rotatably supported in openings in said bracket flanges, a worm wheel intermediate said bracket flanges and mounted on said tilt shaft for rotation therewith, a member rotatably supported by the bracket ears, a worm fixed on said member and meshed with said worm wheel, a plurality of discs secured in relatively spaced relation upon one end portion of the member for rotation therewith, and a tilt cord having an intermediate portion secured to one of said discs with adjacent cord portions coiled about said member in opposite directions at respectively opposite sides of said one disc.

3. Tilt mechanism for a Venetian blind comprising a bracket including upper closely spaced parallel flanges and lower relatively widely spaced parallel ears extending at right angles to said flanges, a tilt shaft of polygonal cross-sectional shape having an end thereof rotatably supported in openings in said bracket flanges, stop means pressed out of one of said bracket plate portions and disposed endwise of said tilt shaft to prevent longitudinal displacement thereof in one direction, a worm wheel intermediate said bracket flanges and mounted on said tilt shaft for rotation therewith, a member rotatably mounted in aligned openings in the bracket ears, a worm fixed on said member and meshed with said worm wheel, a disc secured upon one end portion of the member for rotation therewith, and a tilt cord having an intermediate portion secured to said disc with adjacent cord portions coiled about said member in opposite directions at respectively opposite sides of said disc.

4. Tilt mechanism for a Venetian blind comprising a bracket including upper closely spaced parallel flanges and lower relatively widely spaced parallel ears extending at right angles to said flanges, a tilt shaft of polygonal cross-sectional shape having an end thereof rotatably supported in openings in said bracket flanges, a worm wheel disposed intermediate said bracket flanges and mounted on said tilt shaft for rotation therewith, a first sleeve rotatably mounted in aligned openings in the bracket ears, a second sleeve secured on said first sleeve intermediate said ears, a worm fixed on said second sleeve and meshed with said worm wheel, a plurality of discs secured in relatively spaced relation upon one end portion of the first sleeve for rotation therewith, one of said discs having a radial slot therein, and a tilt cord having an intermediate portion securely engaged in said radial slot with adjacent cord portions coiled about said first sleeve in opposite directions at respectively opposite sides of said one disc.

5. Tilt mechanism for a Venetian blind comprising a bracket including upper closely spaced parallel flanges and lower relatively widely spaced parallel ears extending at right angles to said flanges, a tilt shaft of polygonal cross-sectional shape having an end thereof rotatably supported in openings in said bracket flanges, stop means pressed out of one of said bracket plate portions and disposed endwise of said tilt shaft to prevent longitudinal displacement thereof in one direction, a worm wheel disposed intermediate said bracket flanges and mounted on said tilt shaft for rotation therewith, a first sleeve rotatably mounted in aligned openings in the bracket ears, a second sleeve secured on said first sleeve intermediate said ears, a worm fixed on said second sleeve and meshed with said worm wheel, a plurality of discs secured in relatively spaced relation upon one end portion of the first sleeve for rotation therewith, one of said discs having a radial slot therein, and a tilt cord having an intermediate portion securely engaged in said radial slot with adjacent cord portions coiled about said first sleeve in opposite directions at respectively opposite sides of said one disc.

WALTER J. STUBER.
JOHN J. DI IENNO.

REFERENCES CITED

The following references are of record in the file of this patent:

UNITED STATES PATENTS

| Number | Name | Date |
|---|---|---|
| 2,031,354 | Wright | Feb. 18, 1936 |
| 2,031,804 | Victori | Feb. 25, 1936 |
| 2,054,240 | Burns | Sept. 15, 1936 |
| 2,141,502 | Ajouelo | Dec. 27, 1938 |
| 2,180,311 | Nisenson | Nov. 14, 1939 |
| 2,223,404 | Burns | Dec. 3, 1940 |
| 2,227,211 | Balthasar | Dec. 31, 1940 |
| 2,247,321 | Stuber | June 24, 1941 |
| 2,269,213 | Lorentzen | Jan. 6, 1942 |
| 2,297,627 | Loehr | Sept. 29, 1942 |
| 2,423,977 | Hunter | July 15, 1947 |